US010034268B1

United States Patent
Hazlewood et al.

(10) Patent No.: US 10,034,268 B1
(45) Date of Patent: Jul. 24, 2018

(54) TECHNIQUES FOR USING A DEVICE'S MAGNETOMETER AS A COMMUNICATION MECHANISM

(71) Applicant: Amazon Technologies, Inc., Seattle, WA (US)

(72) Inventors: William R. Hazlewood, Seattle, WA (US); Neeresh Padmanabhan, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 4 days.

(21) Appl. No.: 15/366,659

(22) Filed: Dec. 1, 2016

(51) Int. Cl.
*H04W 4/02* (2018.01)
*H04W 68/00* (2009.01)
*H04W 4/00* (2018.01)
*H04W 4/80* (2018.01)
*H04W 84/18* (2009.01)

(52) U.S. Cl.
CPC .......... *H04W 68/00* (2013.01); *H04W 4/008* (2013.01); *H04W 4/02* (2013.01); *H04W 4/80* (2018.02); *H04W 84/18* (2013.01)

(58) Field of Classification Search
CPC ....... H04W 68/00; H04W 4/008; H04W 4/02; H04B 5/031; G06Q 20/322; G06Q 20/36; G06Q 20/3278; G06Q 20/3674; G06Q 20/02; G06Q 20/20; G06K 7/08
See application file for complete search history.

(56) References Cited

U.S. PATENT DOCUMENTS

| 9,022,285 B2 * | 5/2015 | Graylin | G06Q 20/3674 235/380 |
| 2016/0180120 A1 * | 6/2016 | Wallner | H04B 5/0031 235/449 |

OTHER PUBLICATIONS

Jiang et al., "Pulse: Low Bitrate Wireless Magnetic Communication for Smartphones," *UbiComp'14*, Seattle, WA (Sep. 13-17, 2014), 5 pages.

* cited by examiner

*Primary Examiner* — Thanh Le
(74) *Attorney, Agent, or Firm* — Kilpatrick Townsend & Stockton LLP

(57) ABSTRACT

Described herein is a system and method for enabling communication with a user device using that user device's magnetometer. In some embodiments, a magnetic beacon may generate a sequence of input signals that correspond to activations and deactivations of a magnetic field. A magnetometer in a user device may detect sudden changes in magnetic field and may be used to determine that those changes include a message. In some embodiments, the user device may monitor for an initiation sequence. Upon detecting a sequence of magnetic field activations and deactivations (which may appear to the magnetometer as a sequence of sudden rotational position changes), the user device may interpret a message conveyed by the magnetic beacon. In some embodiments, the user device may communicate the message to a service provider computer, which may subsequently identify additional information related to the message and provide that additional information to the user device.

18 Claims, 8 Drawing Sheets

TECHNIQUES FOR USING A DEVICE'S MAGNETOMETER AS A COMMUNICATION MECHANISM

BACKGROUND

With the increasing popularity of mobile applications, users of mobile devices are facing increased demands on bandwidth of those devices. Mobile applications must often compete with other applications for use of that bandwidth. Users are also sometimes restricted in their use of bandwidth. For example, some users have monthly bandwidth allotments based on their current data plan.

Additionally, with recent advances in mobile device technology, specialized circuitry is becoming increasingly available and inexpensive. For example, in recent years, magnetometers have been miniaturized to the extent that they can be incorporated in integrated circuits at very low cost. These magnetometers are finding increasing use as compasses in user devices such as mobile phones and tablet computers.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein include a system and method for enabling communication with a user device using that user device's magnetometer. In some embodiments, a magnetic beacon may generate a sequence of activations and deactivations of a magnetic field. The user device's magnetometer may detect the sudden changes in magnetic field and may be used to determine that the changes include a message. In some embodiments, the user device may monitor changes in the magnetic field upon detecting an initiation character or an initiation sequence. Upon detecting a sequence of magnetic field activations and deactivations (which may appear to the magnetometer as a sequence of sudden rotational position changes), the user device may interpret a message conveyed by the magnetic beacon. In some embodiments, the user device may communicate the message to a service provider computer, which may subsequently identify additional information related to the message and provide that additional information to the user device.

For example, in some embodiments of the disclosure, a magnetic beacon may be configured to convey a particular sequence of activations/deactivations of a magnetic field that corresponds to a string of characters. The sequence may or may not be preceded by an initiation sequence (e.g., a sequence that indicates the beginning of a message). Upon detecting that the sequence corresponds to a message, a mobile application installed on, and executed from, a user device may obtain input from the device's magnetometer, interpret the obtained input, and communicate that input to a service provider computer. In some embodiments, the conveyed message may comprise a code or other suitable shortened form of data. Upon receiving the code, the service provider may provide the user device with offers relevant to the code, a website related to the code, or any other suitable information.

Figure 1:
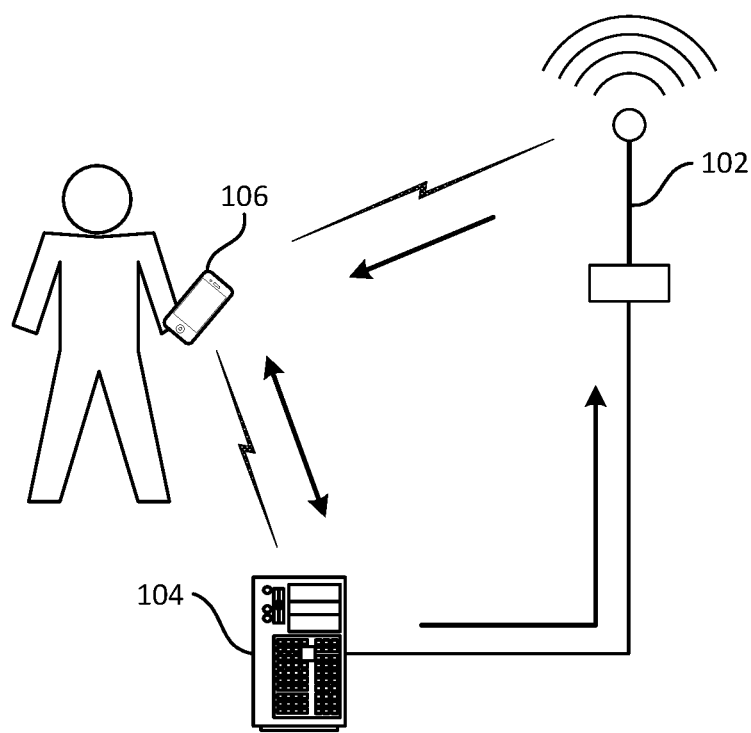
FIG. 1 depicts an illustrative example of a magnetic beaconing system as described in accordance with embodiments of the disclosure.

FIG. 1 depicts an illustrative example of a magnetic beaconing system as described in accordance with embodiments of the disclosure. In FIG. 1, a magnetic beacon 102 may be in communication with a service provider computer 104. The magnetic beacon 102 may be configured to provide information to a user device 106, which may subsequently communicate with the service provider computer 104.

In accordance with at least some embodiments, a magnetic beacon 102 may be any device capable of altering and/or producing magnetic fields in a controlled manner. In some embodiments, the magnetic beacon 102 may be configured to generate signals that can be interpreted by a user device 106 using a magnetometer. For example, a magnetic beacon 102 may use an electromagnet to generate a magnetic field. In some embodiments, the power provided to the electromagnet may be pulsed or varied in order to convey information. For example, a magnetic beacon may be configured to generate a magnetic field for a fixed amount of time followed by an interval in which generation of the magnetic field is halted. In a second example, the magnitude of the magnetic field may be altered with respect to time. In this example, a relative magnitude of the magnetic field may be used to represent particular pieces of information.

In accordance with embodiments of the disclosure, a user device 106 may interpret signals generated by a magnetic beacon 102. The magnetometer sensor in a user device 106 may be configured to utilize solid state technology to create a miniature Hall-effect sensor that detects the Earth's magnetic field along three perpendicular axes X, Y and Z. The Hall-effect sensor may produce voltage which is proportional to the strength and polarity of the magnetic field along the axis each sensor is directed along. The sensed voltage may then be converted to a digital signal representing the magnetic field intensity. In some embodiments, technologies used for a magnetometer may include magneto resistive devices which change the measured resistance based on changes in the magnetic field. The user device may interpret a signal received via a magnetometer in accordance with a set of computer executable instructions (e.g., a mobile application) stored on, and executed from, the user device.

As depicted by the arrows in FIG. 1, the magnetic beacon 102 may act as a unidirectional (i.e., one-way) communication mechanism in that the magnetic beacon may generate an information signal, but may not be capable of receiving a response. For example, the magnetic beacon 102 may, in response to receiving instructions from the service provider computer 104, locally broadcast, by altering magnetic fields information, a message that may be intercepted by any user device 106 in the vicinity of the magnetic beacon 102. Upon intercepting the message, the user device 106 may be configured to establish a communication session with a service provider computer 104 based on the information.

For simplicity of illustration, a certain number of components are shown in FIG. 1. It is understood, however, that embodiments of the invention may include more than one of each component. In addition, some embodiments of the invention may include fewer than or greater than all of the components shown in FIG. 1. In addition, the components in FIG. 1 may communicate via any suitable communication medium (including the internet), using any suitable communication protocol.

Figure 2:
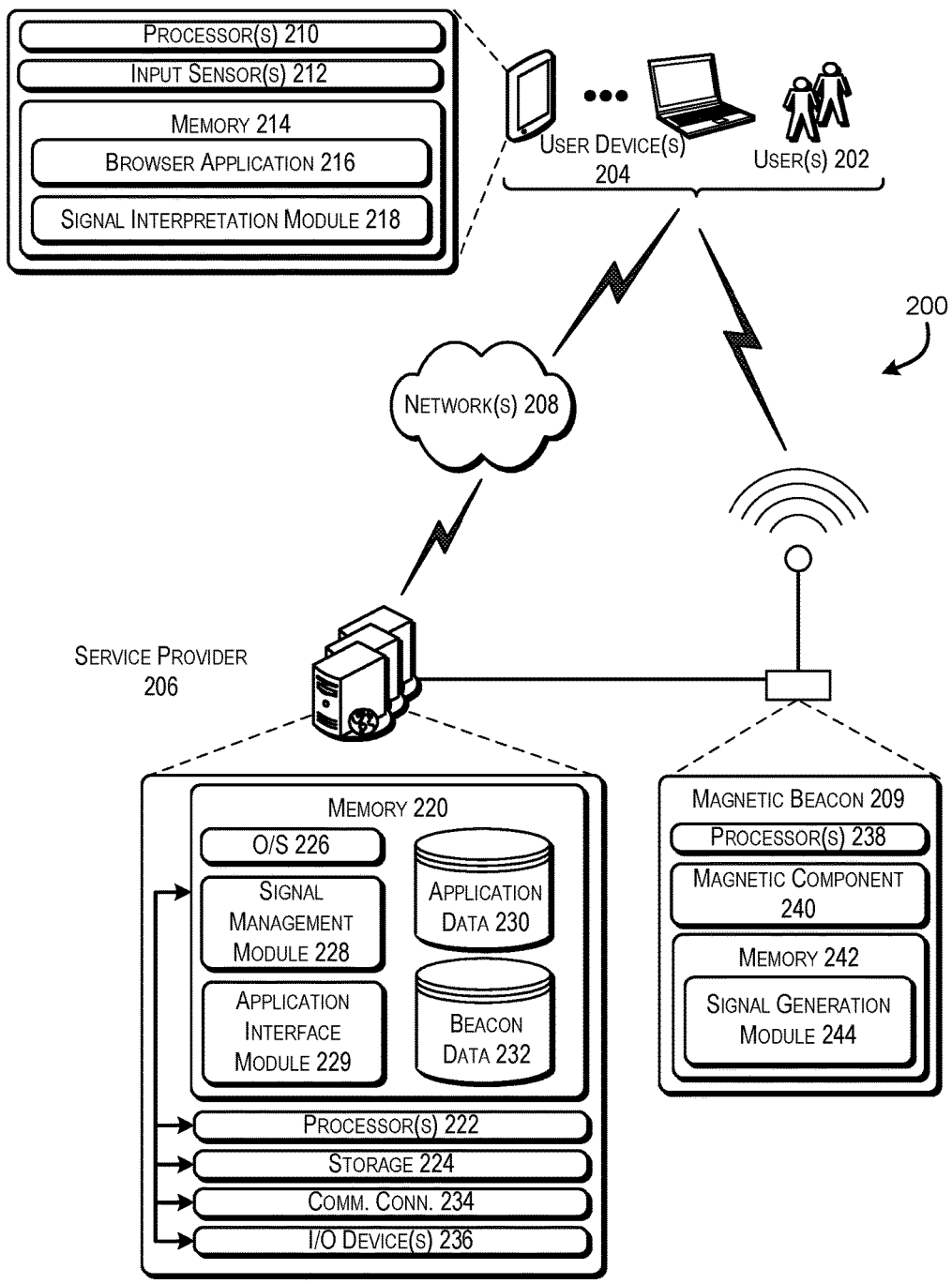
FIG. 2 depicts an illustrative example of a system or architecture in which techniques for using a user device's magnetometer as a communication mechanism may be implemented.

FIG. 2 depicts an illustrative example of a system or architecture 200 in which techniques for using a user device's magnetometer as a communication mechanism may be implemented. In architecture 200, one or more consumers and/or users 202 may utilize user devices 204. In some examples, the user devices 204 may be in communication with a service provider 206 via the network(s) 208, or via other network connections. In addition, architecture 200 may comprise one or more magnetic beacons 209 in communication with service provider 206 and user devices 204.

The user devices 204 may be any type of computing device such as, but not limited to, a mobile phone, a smart phone, a personal digital assistant (PDA), a laptop computer, a desktop computer, a server computer, a thin-client device, a tablet PC, etc. Additionally, user devices 204 may be any type of wearable technology device, such as a watch, earpiece, glasses, etc. The user device 204 may include one or more processors 210 capable of processing user input. The user device 204 may also include one or more input sensors 212 for receiving user input. As is known in the art, there are a variety of input sensors 212 capable of detecting user input, such as accelerometers, cameras, microphones, etc. The user input obtained by the input sensors may be from a variety of data input types, including, but not limited to, audio data, visual data, or biometric data. Input sensors 212 may comprise at least a magnetometer configured to measure a direction and/or a strength of a magnetic field. The primary purpose of a user device's magnetometer may be to determine a direction in which the user device is facing. However, in accordance with embodiments of this disclosure, a magnetometer installed in the user device 204 may be used, in conjunction with computer executable instructions, to detect a message conveyed by a magnetic beacon 209. The user device's ability to receive/interpret this message may depend on a number of capabilities of the magnetometer. For example, some aspects of the magnetometer that may influence the user device's ability to interpret information conveyed may be a sample rate, bandwidth, or resolution of the magnetometer. A sample rate is the number of readings that the magnetometer obtains per second. The inverse is the cycle time in seconds per reading. A magnetometer's sample rate determines the amount of time between measurements made by the magnetometer. A magnetometer's bandwidth, or bandpass, characterizes how well a magnetometer tracks rapid changes in magnetic field. For magnetometers with no onboard signal processing, bandwidth is determined by the Nyquist limit set by the sample rate. In some embodiments, a magnetometer may perform smoothing or averaging of a detected signal over sequential samples, resulting in achieving a lower noise level as well as a lower bandwidth. A magnetometer's resolution is the smallest change in magnetic field the magnetometer can resolve. Embodiments of the application on the user device 204 may be stored and executed from its memory 214.

Turning to the contents of the memory 214 in more detail, the memory 214 may include a browser application 216. The memory 214 may also include a signal interpretation module 218 that is capable of detecting the presence of a magnetic beacon and interpreting information embedded in a signal emitted by the magnetic beacon 209. Although sample architecture 200 depicts a signal interpretation module 218 as being included in the contents of the memory 214 of the user device 204, some embodiments may not include a signal interpretation module 218 in memory 214 of the user device 204. In those embodiments in which the signal interpretation module 218 is not included in memory 214, input received by the input sensors 212 may instead be processed by the service provider 206. This will be described in detail below.

In some embodiments, the signal interpretation module 218 may be a mobile application installed on, and executed from, the user device 204. The service provider 206 may, in some embodiments, comprise a mobile application server associated with the signal interpretation module 218 mobile application. The signal interpretation module 218 may be configured to detect the presence of a magnetic beacon 209 and/or interpret information provided via the magnetic beacon 209. In some embodiments, the signal interpretation module 218 may access mapping information stored in memory 214 that provides mapping from received signal information to characters, symbols, or phrases. For example, upon detecting a particular sequence of changes in magnetic field, the signal interpretation module 218 may identify a particular character or string of characters associated with that sequence. In this example, the signal interpretation module 218 may identify an instruction or set of instructions to be executed based on the interpreted information. In some embodiments, this may require interaction with the service provider 206. For example, upon interpreting a string of characters conveyed by a magnetic beacon 209, the signal interpretation module 218 may determine that the string of characters corresponds to an item identifier. In this example, the signal interpretation module 218 may cause the user device 204 to transmit the string of characters to the service provider 206. The service provider 206 may, upon receiving the string of characters, retrieve information related to the item with which the item identifier corresponds, and may provide that information to the signal interpretation module 218. In another example, a string of characters conveyed by a magnetic beacon 209 may represent a user device's current location. In this example, the string of characters may be conveyed to the service provider 206 and the service provider 206 may subsequently identify location-specific information to be provided to the user device 204. In some embodiments, upon its execution, the signal interpretation module 218 may be configured to obtain input from a magnetometer installed in the user device 204. Upon detecting an initiation signal, the signal interpretation module 218 may obtain and interpret a signal that follows the initiation signal. In some embodiments, the signal interpretation module 218 may act passively (e.g., the signal interpretation module 218 may run in the background without requiring interaction by a user 202).

In some examples, the network(s) 208 may include any one or a combination of many different types of networks, such as cable networks, the Internet, wireless networks, cellular networks, and other private and/or public networks. While the illustrated example represents the users 202 accessing the service provider 206 via browser application 216 over the network(s) 208, the described techniques may equally apply in instances where the users 202 interact with a service provider 206 via the user device 204 over a landline phone, via a kiosk, or in any other manner. It is also noted that the described techniques may apply in other client/server arrangements (e.g., set-top boxes, etc.), as well as in non-client/server arrangements (e.g., locally stored applications, peer to-peer systems, etc.).

As described briefly above, the browser application 216 may allow the users 202 to interact with a service provider 206, such as to store, access, and/or manage data, develop and/or deploy computer applications, and/or interact with web content. The one or more service providers 206, perhaps arranged in a cluster of servers or as a server farm, may be configured to host a website (or combination of websites) viewable via the user device 204 or a web browser accessible by a user device 204 via the browser application 216. Although depicted in memory of the user device 204 in this example, in some embodiments the browser application 216 may be hosted at a server. For example, the user device 204 may be a thin client device capable of accessing a browser application 216 remotely. The browser application 216 may be capable of handling requests from many users 202 and serving, in response, various user interfaces that can be rendered at the user device 204 such as, but not limited to, a web site. The browser application 216 may be any type of application or interface that supports user interaction with a website, including those with user interaction, such as social networking sites, electronic retailers, informational sites, blog sites, search engine sites, news and entertainment sites, and so forth. As discussed above, the described techniques can similarly be implemented outside of the browser application 216, such as with other applications running on the user device 204.

The service provider 206 may be any type of computing device such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider 206 may be executed by one more virtual machines implemented in a hosted computing environment. The hosted computing environment may include one or more rapidly provisioned and released computing resources, which computing resources may include computing, networking, and/or storage devices. A hosted computing environment may also be referred to as a cloud-computing environment.

In one illustrative configuration, the service provider 206 may include at least one memory 220 and one or more processing units (or processor(s)) 222. The processor(s) 222 may be implemented as appropriate in hardware, computer-executable instructions, firmware or combinations thereof. Computer-executable instruction or firmware implementations of the processor(s) 222 may include computer-executable or machine executable instructions written in any suitable programming language to perform the various functions described.

The memory 220 may store program instructions that are loadable and executable on the processor(s) 222, as well as data generated during the execution of these programs. Depending on the configuration and type of service provider 206, the memory 220 may be volatile (such as random access memory (RAM)) and/or non-volatile (such as read-only memory (ROM), flash memory, etc.). The service provider 206 may also include additional storage 224, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 220 may include multiple different types of memory, such as static random access memory (SRAM), dynamic random access memory (DRAM) or ROM. Turning to the contents of the memory 220 in more detail, the memory 220 may include an operating system 226 and one or more application programs or services for implementing the features disclosed herein including at least a module for managing signals provided to one or more magnetic beacons 209 (e.g., signal management module 228) and/or a module for managing information provided to a user device 204 (e.g., application interface module 229). The memory 220 may also include application data 230, which provides information to be provided to a user device 204 and/or beacon data 232, which provides information to be conveyed by one or more magnetic beacons 209. In some embodiments, the application data 230 may be stored in a database.

The memory 220 and the additional storage 224, both removable and non-removable, are examples of computer-readable storage media. For example, computer-readable storage media may include volatile or non-volatile, removable or non-removable media implemented in any method or technology for storage of information such as computer-readable instructions, data structures, program modules or other data. As used herein, modules may refer to programming modules executed by computing systems (e.g., processors) that are part of the user device 204 or the service provider 206. The service provider 206 may also contain communications connection(s) 234 that allow the service provider 206 to communicate with a stored database, another computing device or server, user terminals, and/or other devices on the network(s) 208. The service provider 206 may also include input/output (I/O) device(s) and/or ports 236, such as for enabling connection with a keyboard, a mouse, a pen, a voice input device, a touch input device, a display, speakers, a printer, etc.

Turning to the contents of the memory 220 in more detail, the memory 220 may include an operating system 226, a database containing application data 230 and the one or more application programs or services for implementing the features disclosed herein, including a signal management module 228 and/or an application interface module 229.

In some embodiments, the signal management module 228 may be configured to, in conjunction with the processors 222, generate signal information to be provided to a magnetic beacon 209. For example, the signal management module 228 may be configured to identify information to be provided by a specific magnetic beacon 209. In this example, the signal management module 228 may be configured to generate a set of instructions, that when executed by the magnetic beacon 209, causes the magnetic beacon to convey a message to one or more nearby user devices 204 via the described techniques.

In some embodiments, the application interface module 229 may be configured to, in conjunction with the processors 222, receive data from the signal interpretation module 218 operating on the user device and retrieve information related to that data. For example, upon receiving a string of characters from the signal interpretation module 218, the application interface module 229 may reference application data 230 to identify information related to that string of characters. For example, the signal interpretation module 218 may receive a string of characters from a magnetic beacon. In this example, the service provider may determine that the string of characters corresponds to an identifier for a particular beacon. The service provider 206 may then determine information relevant to that particular beacon. To be more specific, in this example, each beacon in the system may be configured to repeat its own identifier. Upon detecting a particular beacon identifier, the service provider 206 may determine that the user device 204 is within the vicinity of the beacon and identify offers or goods that are also within the vicinity of that beacon.

In some embodiments, a magnetic beacon may comprise any electronic device configured to generate a magnetic field strong enough to exhibit an effect on a magnetometer of a user device 204. In some embodiments, the magnetic beacon may comprise a computing device that includes at least one or more processors 238, a magnetic component 240, and a memory 242. A magnetic component 240 may include any magnetic field generating component. For example, a magnetic component 240 may comprise an electromagnet. In some embodiments, power provided to the magnetic component 240 may be controlled via the one or more processors 238, such that the resulting magnetic field may be manipulated in order to convey a message.

In some embodiments, the memory 242 may comprise a signal generation module 244, configured to cause, in conjunction with the processors 238, the magnetic component 240 to convey a message to one or more user devices 204 in the area. In some embodiments, the memory 242 and corresponding signal generation module 244 may comprise an application-specific integrated circuit (ASIC) or field programmable gate array (FPGA).

Although the signal management module 228 and application data 230 are depicted in FIG. 2 as being implemented in the memory 220 of the service provider 206, it is envisioned that one or both of the application interface module 229 and the application data 230 could also be implemented in the memory 214 of the user device 204 (such as by signal interpretation module 218). In some embodiments, a portion of the signal interpretation may be performed at either the service provider 206 by the application interface module 229 and/or the user device 204 by the signal interpretation module 218. It is intended that this disclosure encompass any combination of these implementations. It should be noted that some embodiments of the disclosure may lack one or more of the modules described in this disclosure. For example, a magnetic beacon may be configured to repeat a string of characters that represents that beacon's location. In this example, there may not be a need for a signal management module 228 as described. Additionally, it should be noted that the described system may comprise multiple computing devices. In some embodiments, the various modules (e.g., the signal management module 228 and/or the application interface module 229) may be installed on, and executed from, different computing devices. For example, the service provider 206 may comprise a server configured to communicate with the user device as well as a local computing device configured to provide instructions to the magnetic beacon. In this example, the application interface module 229 may be installed on the server and the signal management module 228 may be installed on the local computing device. The multiple computing devices that comprise the service provider 206 may or may not be in communication with each other.

Figure 3:
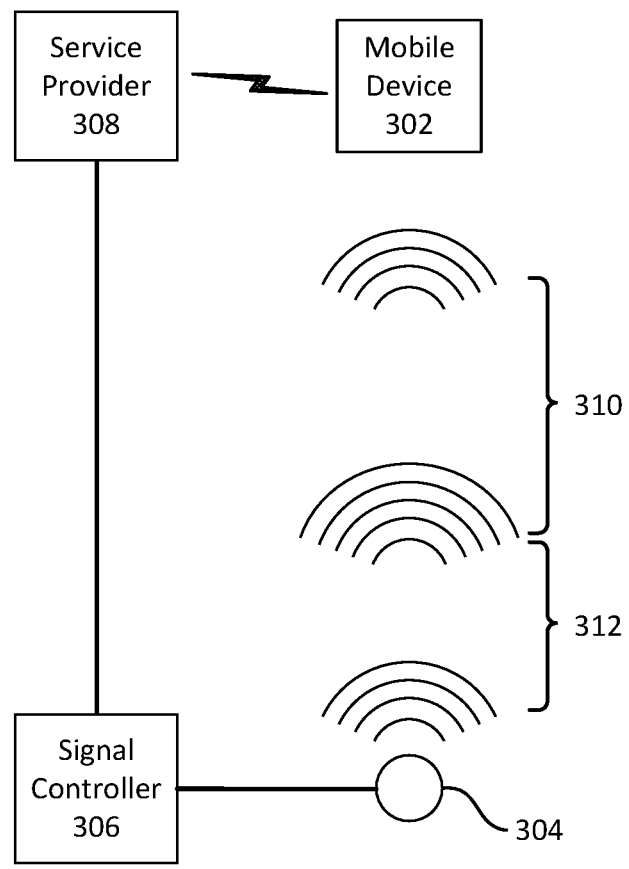
FIG. 3 depicts a first illustrative example of a magnetic-based communication system in accordance with embodiments of the disclosure.

FIG. 3 depicts a first illustrative example of a magnetic-based communication system in accordance with embodiments of the disclosure. In FIG. 3, a user device 302 may be located in the vicinity of at least one magnetic beacon 304. In this illustrative example, the magnetic beacon 304 may be in communication with a signal controller 306. In some embodiments, the user device 302 may be configured to interact with a service provider 308 to retrieve information related to a message conveyed via the magnetic beacon 304.

In some embodiments the user device 302 may execute a mobile application which is configured to monitor the rotational position of the user device 302 via input provided by a magnetometer. In some embodiments, the mobile application may cause the user device to identify changes in magnetic field caused by the magnetic beacon 304.

In some embodiments, the magnetic beacon 304 may be configured to activate and deactivate a magnetic field to generate a sequence of positional changes that may be interpreted using a magnetometer of a user device 304. In some embodiments, the magnetic beacon 304 may vary the strength of the magnetic field and/or the length of time intervals between activation or deactivation of those magnetic fields. For example, a length of the time interval for which a magnetic field is activated may be used to at least partially identify a character as well as a length of the time interval between activations of the magnetic field (e.g., 310 and 312). In some embodiments, the magnetic field may be varied in order to convey specific characters. In some embodiments, the magnetic beacon 304 may convey messages using one or more encoding techniques (e.g., via Morse code).

Figure 4:
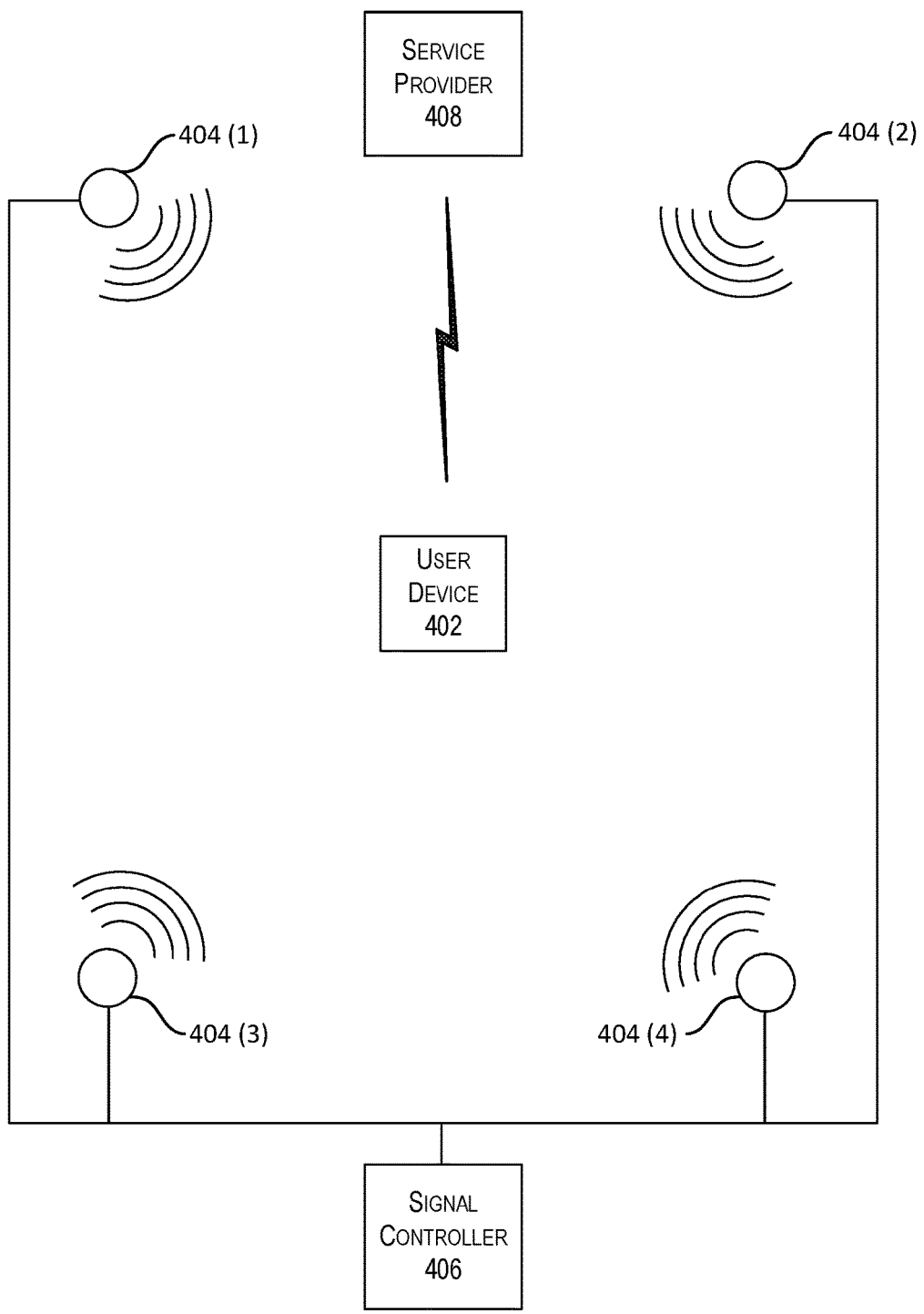
FIG. 4 depicts a second illustrative example of a magnetic-based communication system in accordance with embodiments of the disclosure.

FIG. 4 depicts a second illustrative example of a magnetic-based communication system in accordance with embodiments of the disclosure. In FIG. 4, a user device 402 may be located in the vicinity of a number of magnetic beacons 404 (1-4). In this illustrative example, the magnetic beacons 404 may be in communication with a signal controller 406. In some embodiments, the user device 402 may be configured to interact with a service provider 408 to retrieve information related to a message conveyed via the magnetic beacons 404.

In accordance with embodiments of the disclosure, a number of magnetic beacons 404 may be activated/deactivated in order to vary a magnetic field in an area. For example, the magnetic beacons 404 may alternate in generating magnetic fields in accordance with instructions provided by a signal controller 406. In this example, various magnetic beacons may be activated in particular sequence, causing a magnetometer in the user device 402 to detect variances in the magnetic field. In this example, the magnetometer may update its estimate of the user device's position based on which magnetic beacon 404 is currently activated. In the illustrated system, this may cause the user device to determine that it is undergoing a sequence of positional changes. The user device may compare this detected sequence of positional changes to one or more sequences stored in the memory of the user device associated with an application acting in accordance with embodiments of the disclosure. For example, the user device may include instructions that cause it to determine if the detected sequence matches an initiation sequence. An initiation sequence may be a signal or series of signals that indicates a beginning of a message to be conveyed.

In accordance with at least some embodiments, the use of multiple magnetic beacons 404 (1-4) surrounding an area may provide the ability to more quickly convey information within that area. For example, in embodiments in which a single magnetic beacon 404 is used to convey information, the conveyance of that information may take longer as the conveyance may rely on binary indicators (i.e., the magnetic field is either being generated or not) which causes the magnetometer to switch between the magnetic field generated by the earth and the magnetic field generated by the magnetic beacon 404 (e.g., activate and deactivate the electromagnet). Information may be conveyed in this fashion (e.g., via Morse code, etc.). However, as the number of magnetic beacons 404 included in the system increases, so does the conveyance of information (e.g., the speed at which information may be conveyed, the types of information that may be conveyed, or both). This is because the number of potential positional changes that may comprise a sequence is increased, which increases the number of combinations that may be achieved from the multiple magnetic beacons 404. By way of illustration, consider a simple binary system in which a magnetic field is either activated or not. In this system, an activation of the magnetic field may be followed by a deactivation of the magnetic field. This may be repeated one or more times to identify a particular character. In this example, the character may be identified based on a number repeated activations, the lengths of those activations, the lengths of deactivations, etc. However, when implementing multiple magnetic beacons 404 around an area, a first magnetic beacon may be activated, followed by a deactivation of the first magnetic beacon and an activation of a second magnetic beacon. In this example, an activation of magnetic beacon 404 (1) followed by an activation of magnetic beacon 404 (2) may indicate a first character, whereas an activation of magnetic beacon 404 (1) followed by an activation of magnetic beacon 404 (3) may indicate a second character, etc. In this example, the number of potential characters that may be conveyed via combinations of magnetic field activations in embodiments of the disclosure may be expressed as $X^N$, where X is the number of potential positional changes (the number of magnetic beacons plus one for the earth's magnetic field) in the system and N is the number of activations needed to identify a character. For example, if there are three magnetic beacons in a system and characters are identified by activating a first magnetic beacon, followed by a second magnetic beacon, and a third magnetic beacon (where each of the magnetic beacons may be the same magnetic beacon), then there are $4^3$, or 64, potential characters. The number of potential characters that may be interpreted from a combination of magnetic field activations may be further increased by using different lengths of magnetic beacon activation.

Figure 5:
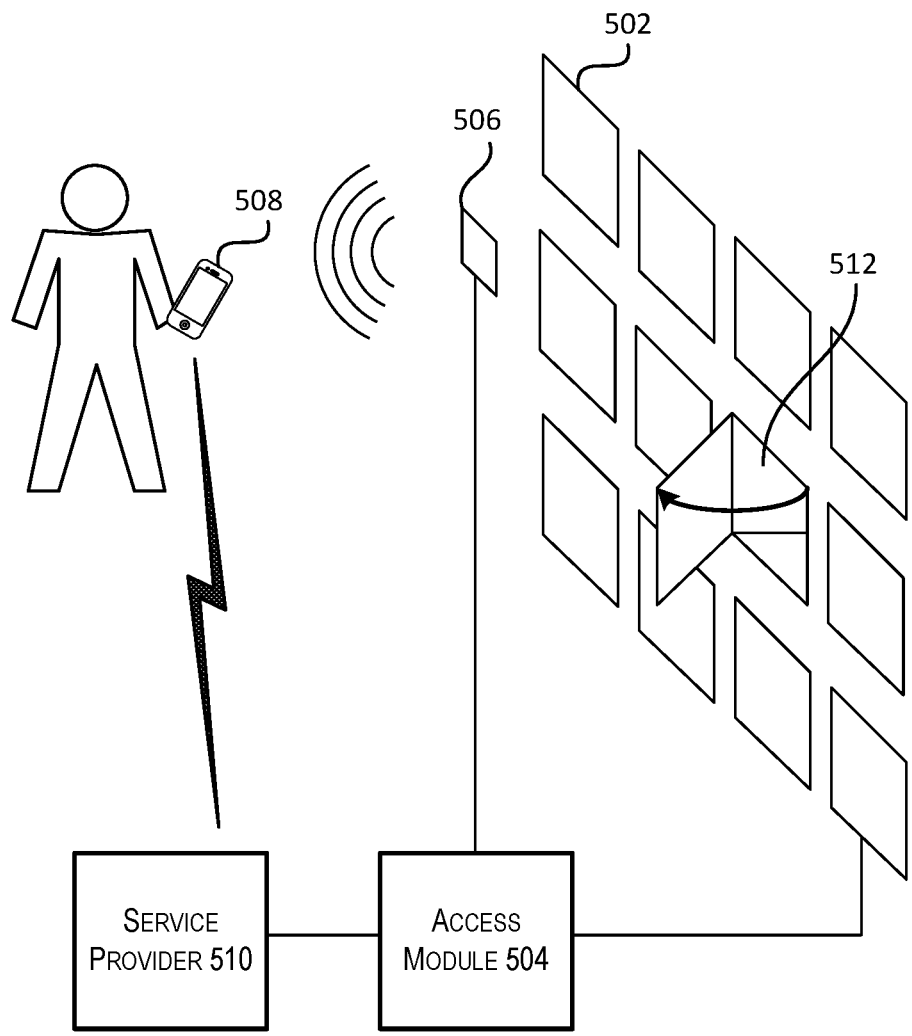
FIG. 5 depicts a first illustrative example of at least some implementations of the described system in accordance with embodiments of the disclosure.

FIG. 5 depicts a first illustrative example of at least some implementations of the described system in accordance with embodiments of the disclosure. In FIG. 5, a number of secure storage locations 502 (e.g., lockers) may be located at a physical location. Access to each of the secure storage locations 502 may be managed by an access module 504. In some embodiments, access module 504 may comprise an electronic circuit (e.g., an application-specific integrated circuit (ASIC)). In some embodiments, the access module 504 may comprise a set of computer-executable instructions installed on, and executed from, a computing device. In some embodiments, the storage locations 502 may be located proximate to a magnetic beacon 506 configured to convey a message by generating magnetic fields in accordance with embodiments of the disclosure.

In some embodiments, the message conveyed by the magnetic beacon 506 may be received by a user device 508. Upon receiving and interpreting the conveyed message, the user device 508 may establish a communication session with a service provider 510. Upon establishing the communication session, the user device 508 may transmit the message to the service provider 510. Upon receiving the message, the service provider 510 may determine additional information relevant to the message. In some embodiments, the determined additional information may be provided to the user device 508. In the illustrative example depicted in FIG. 5, the message may comprise location information for the storage locations 502 (e.g., an identifier associated with the storage locations 502). In this example, the service provider 510 may determine, upon receiving the location identifier and additional information provided by the user device 508 (e.g., a phone number, account number, etc.), whether the user is authorized to access one or more of the secure storage locations 502. For example, the service provider 510 may determine whether the user has a package stored in a storage location 502.

In this illustrative example, the service provider 510 may transmit instructions to the access module 504 to grant access to a secure storage location 512. For example, upon receiving the location information from the user device 508, the service provider may determine that a user of the user device 508 is currently authorized to access storage location 512. Upon making this determination, the service provider 510 may generate instructions to unlock and/or open storage location 512. In some embodiments, the service provider 510 may communicate with the user device 508 to obtain permission from a user prior to providing the generated instructions to the access module 504. For example, the service provider 510 may provide information to the user device 508 that the user is authorized to access storage location 512. Upon receiving that information, the user device may display a prompt to ask the user whether he or she would like to unlock the storage location 512. The user device may communicate a received selection to the service provider 510. In embodiments of the disclosure, the generated set of instructions, when provided to the access module 504, may cause the access module 504 to open storage location 512.

Figure 6:
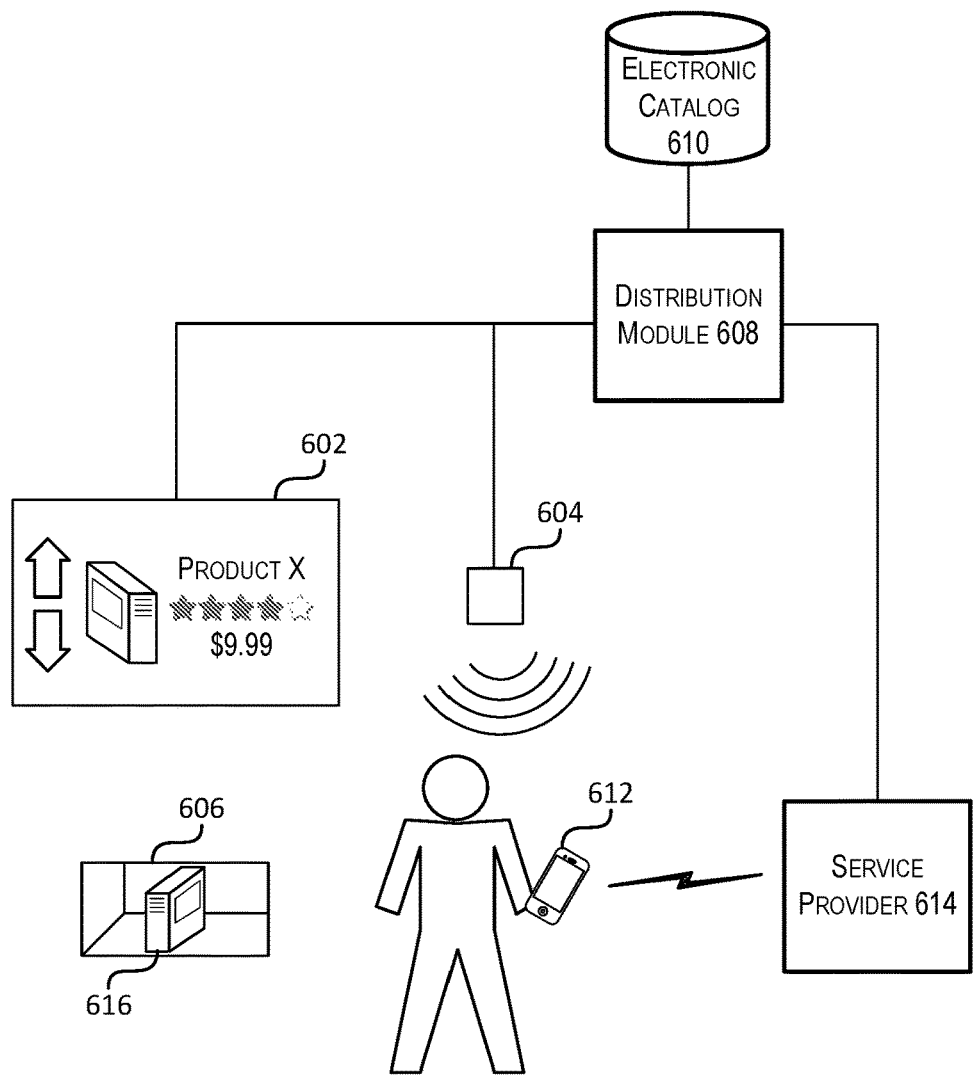
FIG. 6 depicts a second illustrative example of at least some implementations of the described system in accordance with embodiments of the disclosure.

FIG. 6 depicts a second illustrative example of at least some implementations of the described system in accordance with embodiments of the disclosure. In FIG. 6, an illustrative kiosk system is depicted which utilizes embodiments of the disclosure. The kiosk system may comprise a display device 602 configured to present information to a user, a magnetic beacon 604 configured to convey information to a user device, a vending area 606, and a distribution module 608 configured to cause an item to be vended via the vending area 606. The distribution module 608 may have access to item information stored in an electronic catalog 610. In some embodiments, the electronic catalog 210 may be stored locally, whereas in some embodiments the electronic catalog 210 may be stored remotely.

In accordance with embodiments of the disclosure, a user may approach the kiosk system in order to purchase an item. Information related to one or more items may be displayed upon the display device 602. Upon selecting an item to be purchased, the magnetic beacon 604 may activate a magnetic field in accordance with a determined sequence in order to convey an item identifier for the selected item to a user device 612. In some embodiments, the magnetic beacon may be configured to repeat the conveyance of the item code a number of times. Upon receiving the item code via the magnetic beacon 604, the user device 612 may establish a communication session with a service provider 614. In some embodiments, the service provider 614 may be associated with a retailer (e.g., an electronic retailer). Upon receiving the item code from the user device 612, the service provider 614 may identify an account associated with the user device. The service provider 614 may conduct a transaction for the item based on account information upon receiving the item code from the user device 612. In some embodiments, the service provider 614 may cause the user device 612 to display a prompt requesting permission to complete the transaction prior to conducting the transaction. In some embodiments, the user may be required to log into an account or otherwise authenticate himself/herself before the transaction may be conducted. Upon completion of the transaction, the service provider 614 may generate instructions to cause the distribution module 608 to dispense the item 616 via the vending area 606. It should be noted that by using techniques described in accordance with the disclosure, the user device 612 is prevented from transmitting sensitive information. This prevents potential interception of sensitive information by unauthorized parties. For example, in embodiments of the disclosure as depicted, there is no transmission of payment information that would allow unauthorized parties to intercept that payment information.

Figure 7:
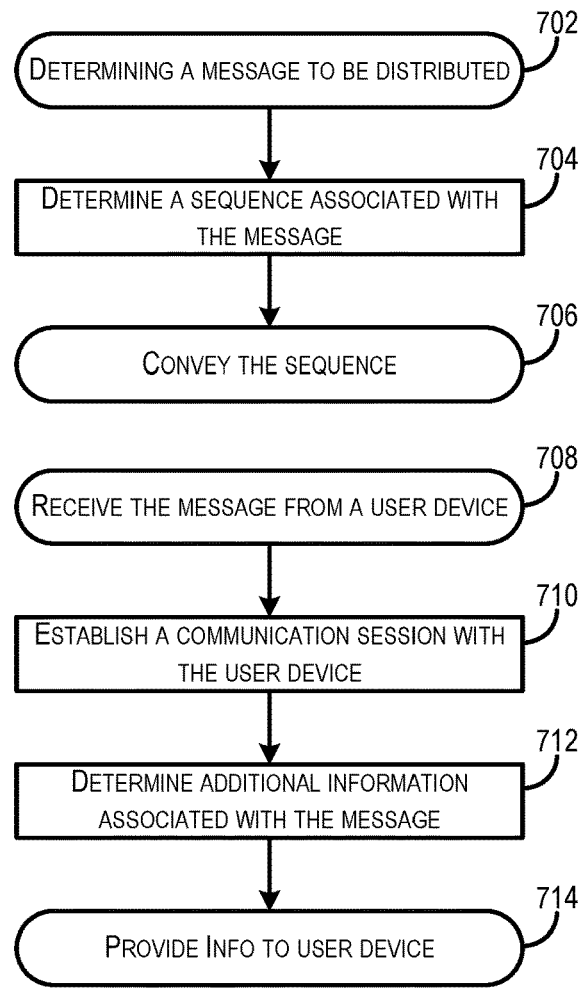
FIG. 7 depicts an illustrative flow chart demonstrating an example communication system using magnetic beacons in accordance with at least some embodiments.

FIG. 7 depicts an illustrative flow chart demonstrating an example communication system using magnetic beacons in accordance with at least some embodiments. The process 700 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement this process and any other processes described herein.

Some or all of the process 700 (or any other processes described herein, or variations and/or combinations thereof) may be performed under the control of one or more computer systems configured with executable instructions and may be implemented as code (e.g., executable instructions, one or more computer programs or one or more applications). In accordance with at least one embodiment, the process 700 of FIG. 7 may be performed by at least the one or more service providers 206 shown in FIG. 2. The code may be stored on a computer-readable storage medium, for example, in the form of a computer program including a plurality of instructions executable by one or more processors. The computer-readable storage medium may be non-transitory.

In some embodiments, process 700 may begin at 702, when a message is identified to be conveyed via generation of magnetic fields. In some embodiments, a magnetic beacon may repeat conveyance of a particular message. For example, a magnetic beacon may be configured to repeat an identifier associated with that magnetic beacon. In some embodiments, instructions for conveying a message may be provided to the magnetic beacon by a service provider computer as describe elsewhere in the specification.

At 704, a sequence of activations/deactivations of a magnetic field may be generated to correspond to the determined message. For example, the message may be translated into a series of binary indicators, each of the binary indicators representing a time period over which a magnetic field is to be activated (e.g., an electromagnet is powered). In some embodiments, an amount of time associated with each activation and/or deactivation may also be used to translate the message into a sequence of activations. In some embodiments, the sequence of actions may comprise activations and deactivations to be performed by multiple magnetic beacons within an area of operation. In some embodiments the sequence may account for a sample rate of a specific user device. For example, the sequence may be generated such that a particular device is capable of interpreting the sequence.

At 706, one or more magnetic beacons may be caused to convey the determined sequence. To do this, the one or more magnetic beacons may activate and deactivate a magnetic field (e.g., by powering an electromagnet) in order to affect a magnetometer in local user devices. In some embodiments, the sequence may include an initiation sequence (e.g., a sequence of activations/deactivations configured to indicate the beginning of a message). In some embodiments, various magnetic beacons located throughout an area of operations may be instructed to activate/deactivate magnetic fields in a particular order and/or at particular times.

At 708, a service provider computer may receive the determined message from a user device. The conveyed message may be obtained by a user device as input from a magnetometer installed in the user device. In some embodiments, the received sequence may be interpreted by a mobile application installed on the user device. In some embodiments, the mobile application installed on the user device may monitor input received via the device's magnetometer in order to detect a message. For example, the mobile application may cause one or more processors in the device to determine whether received input matches a sequence that may be translated as a character. In some embodiments, the mobile application may cause one or more processors in the device to identify an initiation sequence. Upon identifying the initiation sequence in the conveyed information, the mobile application may be configured to interpret sequence information received subsequent to the initiation sequence. In some embodiments, the mobile application may determine that the message has concluded upon detecting a second initiation sequence.

At 710, the service provider may establish a communication session with the user device. For example, the user device may communicate the message to the service provider via a network connection. The user device may additionally be configured to provide additional details to the service provider. In this example, the service provider, upon receiving the message and additional details, may identify a user and/or account associated with the user device. Once identified, the service provider may instantiate a new instance of a communication session between the user device and the service provider in order to track communications between the two devices.

At 712, additional information associated with the message may be identified. For example, the message may comprise an identifier that corresponds to additional information stored by the service provider. In accordance with at least some embodiments, an amount of information that may be conveyed using the disclosed techniques may rely on a sample rate and/or bandwidth of the user device's magnetometer. Accordingly, it may be necessary in some embodiments to limit the amount of information conveyed in a message. The message may comprise a code which is relatively shorter than the actual information to be conveyed to the user device. Upon receiving the code from the user device, the service provider may identify the actual information to be provided and may transmit that information to the user device. In some embodiments, the message may comprise an identifier (e.g., an identifier of the magnetic beacon, a location, an item, or any other suitable identifier). For example, the service provider may receive a location identifier from a user device. Upon receiving that location identifier, the service provider may identify a number of offers associated with that location to be provided to the user device.

At 714, the additional information may be provided to the user device. In some embodiments, the additional information may comprise a request to perform an additional action with respect to the additional information. For example, upon receiving an identifier for an item, the user device may be provided with a prompt to initiate a transaction for the item. In some embodiments, the additional information may comprise a message to be displayed on the user device. For example, upon receiving a location identifier, the service provider may identify one or more offers to be presented on the user device. In this example, the service provider may provide the offer to the user device, which may display that offer within a graphical user interface (GUI).

The system described herein provides for multiple technical advantages. For example, almost all mobile devices and tablets have a magnetometer chip that can act as a compass. Access to this chip from any application is not typically restricted for battery or security reasons (i.e. any application can request unrestricted access to magnetometer input). Because of this, the system enables mobile devices to gain access to information even when other transmission means are unavailable or restricted. Additionally, the described system enables information to be provided to a mobile device without using that mobile device's wireless bandwidth. It should be noted that a number of additional technical advantages may be obtained by use of the disclosed system.

Figure 8:
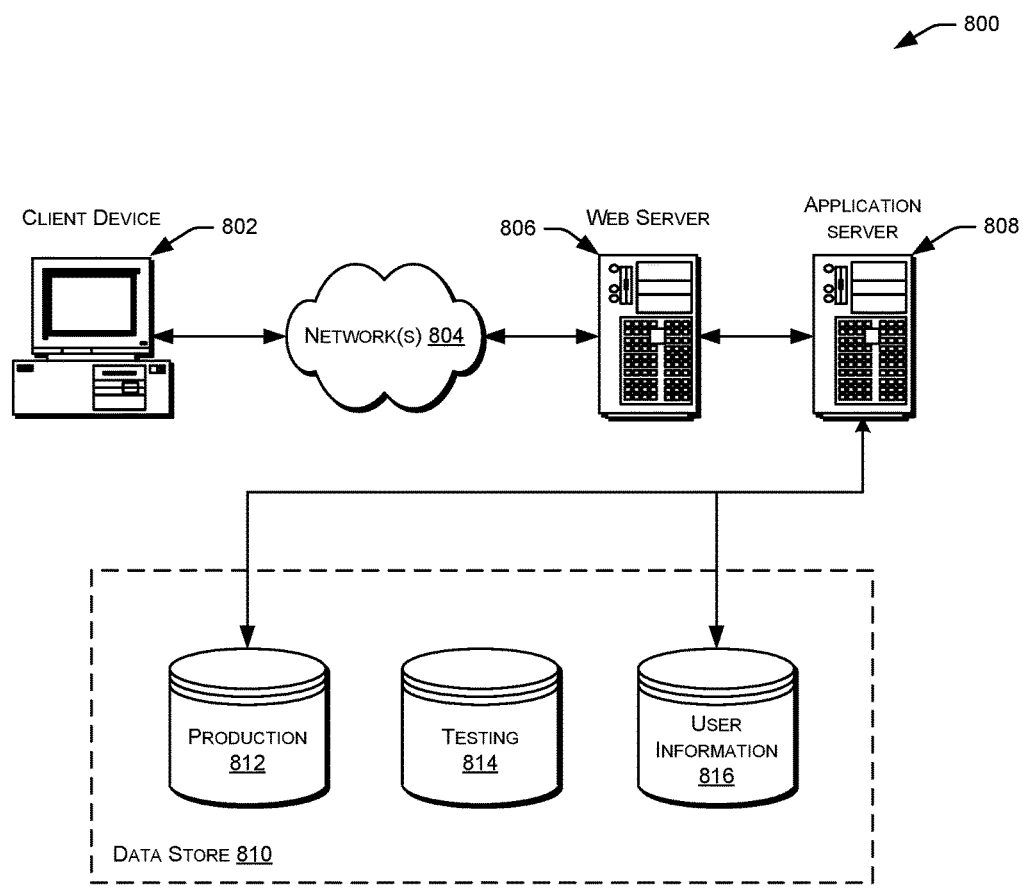
FIG. 8 illustrates an environment in which various embodiments can be implemented.

FIG. 8 illustrates aspects of an example environment 800 for implementing aspects in accordance with various embodiments. As will be appreciated, although a Web-based environment is used for purposes of explanation, different environments may be used, as appropriate, to implement various embodiments. The environment includes an electronic client device 802, which can include any appropriate device operable to send and receive requests, messages or information over an appropriate network 804 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 802 and the application server 808, can be handled by the Web server. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing production data 812 and user information 816, which can be used to serve content for the production side. The data store also is shown to include a mechanism for storing log data 814, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A system comprising:
    a magnetic beacon device configured to generate a magnetic field;
    a processor; and
    a memory including instructions that, when executed with the processor, cause the system to, at least:
        determine a message to be distributed to one or more user devices, the message associated with additional information;
        cause the magnetic beacon device to generate a signal that corresponds to the message by activating or deactivating the magnetic field in a specific sequence;
        receive, from a user device of the one or more user devices, an indication of the message;
        identify the additional information associated with the message; and
        provide the additional information to the user device.

2. The system of claim 1, wherein the additional information is specific to the magnetic beacon device.

3. The system of claim 2, wherein the additional information pertains to location information associated with the magnetic beacon device.

4. The system of claim 1, wherein the specific sequence is determined based on an encoding technique.

5. A computer-implemented method, comprising:
    determining a message to be distributed to one or more user devices;
    generating a magnetic field to convey the message to the one or more user devices, the message conveyed by activating or deactivating the magnetic field in a specific sequence;
    receiving an indication of the message from at least one user device of the one or more user devices;
    determining additional information associated with the message; and
    providing the additional information to the at least one user device.

6. The computer-implemented method of claim 5, wherein generating the magnetic field to convey the message to the one or more user devices comprises activating a number of magnetic beacons in the specified sequence.

7. The computer-implemented method of claim 5, wherein the message pertains to an item.

8. The computer-implemented method of claim 7, wherein the additional information associated with the message comprises a network page for the item.

9. The computer-implemented method of claim 5, wherein the additional information comprises information for conducting a transaction for the item.

10. The computer-implemented method of claim 5, further comprising upon receiving the indication of the message from the at least one user device, establishing a communication session with the at least one user device.

11. The computer-implemented method of claim 5, wherein the message comprises a string of characters.

12. The computer-implemented method of claim 5, wherein the indication of the message is received from the at least one user device via a network connection.

13. A non-transitory computer readable medium storing specific computer-executable instructions that, when executed by a processor, cause a computer system to at least:
    determine a message to be distributed to one or more user devices;
    generate a magnetic field to convey the message to the one or more user devices, wherein the message is conveyed as a sequence of magnetic field activations;
    receive an indication of the message from at least one user device of the one or more user devices;
    determine additional information associated with the message; and provide the additional information to the at least one user device.

14. The computer readable medium of claim 13, wherein the sequence of magnetic field activations comprises activations that vary in time.

15. The computer readable medium of claim 13, wherein the sequence of magnetic field activations comprises deactivations that vary in time.

16. The computer readable medium of claim 13, wherein the message comprises an indication of a location.

17. The computer readable medium of claim 16, wherein the additional information comprises at least one offer relevant to the location.

18. The computer readable medium of claim 13, wherein the additional information comprises a prompt to perform an additional action.

* * * * *